United States Patent
Katayama et al.

(10) Patent No.: US 10,096,855 B2
(45) Date of Patent: Oct. 9, 2018

(54) REDOX FLOW CELL MEMBRANE

(71) Applicant: SUMITOMO ELECTRIC INDUSTRIES, LTD., Osaka-shi, Osaka (JP)

(72) Inventors: Hirokazu Katayama, Osaka (JP); Yasuhiro Okuda, Osaka (JP); Naoki Shimbara, Osaka (JP); Toshio Shigematsu, Osaka (JP); Yongrong Dong, Osaka (JP); Kei Hanafusa, Osaka (JP); Fumihiro Hayashi, Osaka (JP); Aya Ooya, Osaka (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 127 days.

(21) Appl. No.: 14/350,968

(22) PCT Filed: Nov. 21, 2012

(86) PCT No.: PCT/JP2012/080138
§ 371 (c)(1),
(2) Date: Apr. 10, 2014

(87) PCT Pub. No.: WO2013/077347
PCT Pub. Date: May 30, 2013

(65) Prior Publication Data
US 2014/0255821 A1 Sep. 11, 2014

(30) Foreign Application Priority Data
Nov. 22, 2011 (JP) .................. 2011-255171

(51) Int. Cl.
*H01M 8/18* (2006.01)
*H01M 8/1067* (2016.01)
(Continued)

(52) U.S. Cl.
CPC ....... *H01M 8/1067* (2013.01); *H01M 8/0289* (2013.01); *H01M 8/188* (2013.01);
(Continued)

(58) Field of Classification Search
CPC ..................................................... H01M 8/188
See application file for complete search history.

(56) References Cited

U.S. PATENT DOCUMENTS 4,053,684 A * 10/1977 Zito, Jr. ............ H01M 8/04186
429/450
5,656,390 A * 8/1997 Kageyama et al. .......... 429/105
(Continued)

FOREIGN PATENT DOCUMENTS

| CN | 101861201 A | 10/2010 |
|---|---|---|
| EP | 2 060 315 A2 | 5/2009 |

(Continued)

OTHER PUBLICATIONS

Weber et al., "Redox flow batteries: a review", Journal of Applied Electrochemistry, vol. 41, No. 10, Sep. 2, 2011, pp. 1137-1164.

*Primary Examiner* — Maria Laios
(74) *Attorney, Agent, or Firm* — Drinker Biddle & Reath LLP

(57) ABSTRACT

A redox flow cell membrane includes a porous membrane that has a mean flow pore size of not more than 100 nm, that has a thickness of not more than 500 μm, and that has an air flow rate of not less than 0.1 ml/s·cm². When the redox flow cell membrane is used for a V—V-based redox flow cell, the porous membrane preferably has a mean flow pore size of not more than 30 nm.

4 Claims, 4 Drawing Sheets

(51) Int. Cl.
  *H01M 8/20* (2006.01)
  *H01M 8/0289* (2016.01)
(52) U.S. Cl.
  CPC ...... *H01M 8/20* (2013.01); *H01M 2300/0082* (2013.01); *Y02E 60/528* (2013.01)

(56) References Cited

U.S. PATENT DOCUMENTS

| | | | | |
|---|---|---|---|---|
| RE37,307 E | * | 8/2001 | Bahar | ............... B01D 67/0088 204/296 |
| 6,461,772 B1 | | 10/2002 | Miyake et al. | |
| 7,927,731 B2 | | 4/2011 | Sahu | |
| 2004/0170893 A1 | | 9/2004 | Nakaishi et al. | |
| 2004/0241519 A1 | * | 12/2004 | Howard | ........................ 429/33 |
| 2006/0228606 A1 | * | 10/2006 | Fiebig | ............... H01M 8/0297 429/410 |
| 2008/0216942 A1 | * | 9/2008 | Hiraoka | ............ B01D 67/0088 156/145 |
| 2009/0169957 A1 | | 7/2009 | Harada | |
| 2010/0003574 A1 | | 1/2010 | Isomura et al. | |
| 2010/0003586 A1 | * | 1/2010 | Sahu | ................... H01M 8/1016 429/101 |
| 2010/0203310 A1 | | 8/2010 | Hayashi et al. | |
| 2010/0305217 A1 | | 12/2010 | Qiu et al. | |
| 2013/0037760 A1 | | 2/2013 | Maeda et al. | |

FOREIGN PATENT DOCUMENTS

| | | |
|---|---|---|
| JP | H06-260183 A | 9/1994 |
| JP | H10-162853 A | 6/1998 |
| JP | 2000-235849 A | 8/2000 |
| JP | 2002-367659 A | 12/2002 |
| JP | 2007-335221 A | 12/2007 |
| JP | 2009-179802 A | 8/2009 |
| JP | 2010-092635 A | 4/2010 |
| JP | 2011-052175 A | 3/2011 |
| JP | 2011-228059 A | 11/2011 |
| TW | 201024346 A1 | 7/2010 |
| WO | WO-2008/018400 A1 | 2/2008 |
| WO | WO 2010/072233 A1 | 7/2010 |

* cited by examiner $V^{5+}[VO_2(SO_4)_2]^{3-}$

REDOX FLOW CELL MEMBRANE

TECHNICAL FIELD

The present invention relates to a membrane used for an electrolytic tank of a redox flow cell.

BACKGROUND ART

A redox flow cell is a type of secondary cell in which charging/discharging is performed using oxidation-reduction reaction by respectively circulating a positive electrode cell active material and a negative electrode cell active material in a positive electrode chamber and a negative electrode chamber using a pump. The positive electrode chamber and negative electrode chamber are obtained by dividing an electrolytic tank using a membrane that permits permeation of hydrogen ions but does not permit permeation of electrolytic ions. A large redox flow cell can be readily obtained, so that the redox flow cell has been expected as a secondary cell to store a large amount of electric power.

As the cell active materials for the redox flow cell, vanadium-based compounds have been widely used in recent years due to the following reasons: they provide excellent electromotive force and excellent cell capacity; regeneration thereof can be readily attained even if the positive electrode electrolyte and the negative electrode electrolyte are mixed with each other; and the like. During charging/discharging in a V—V-based redox flow cell employing such vanadium (V)-based compounds as the cell active materials, oxidation or reduction takes place between +4 valent V ions and +5 valent V ions in the positive electrode chamber and oxidation or reduction takes place between +2 valent V ions and +3 valent V ions in the negative electrode chamber.

In order to obtain excellent charging/discharging efficiency (high energy efficiency=high voltage efficiency×high current efficiency), a redox flow cell membrane is required to have a low membrane resistance (electric resistance during charging/discharging) and a property to prevent mixing of the electrolytes between the positive electrode chamber and the negative electrode chamber. Specifically, the redox flow cell membrane is required to have excellent permeability for hydrogen ions ($H^+$; hydronium ions) and is also required to less likely permit permeation of electrolytic ions (excellent selective permeability). In view of this, for a redox flow cell membrane, an ion exchange membrane selectively permitting permeation of ions has been employed conventionally.

Further, the redox flow cell membrane is required to have excellent durability such that performance of the membrane is not decreased due to contact with the electrolytes for a long time as well as repeated charging/discharging. In particular, the V—V-based redox flow cell membrane is required to have a strong oxidation resistance because it is subjected to pentavalent V ions, which are strong in oxidation power.

As a cell membrane satisfying the above-described requirements, a polysulfone-based anion exchange membrane, a vinyl-based anion exchange membrane having a pyridinium group, or the like has been proposed (Patent Document 1 (Japanese Patent Laying-Open No. 2000-235849) and Patent Document 2 (Japanese Patent Laying-Open No. 10-162853)). Also proposed as such a cell membrane is an ion exchange membrane in which a resin composition, which includes an ion exchange resin and a copolymer obtained through hydrogenation treatment of a copolymer of conjugated diolefin and a styrene-based monomer, is adhered to a base material (Patent Document 2).

Known examples of a material of the base material of the cell membrane include porous polyvinyl chloride, polyolefin, polytetrafluoroethylene (PTFE), and the like (paragraph 0022 of Patent Document 2; claim 2 of Patent Document 1).

There has been also known a redox flow cell including an ion exchange membrane having a performance index advantageous to improve voltage efficiency and ampere-hour efficiency (Patent Document 3).

CITATION LIST

Patent Document

PTD 1: Japanese Patent Laying-Open No. 2000-235849
PTD 2: Japanese Patent Laying-Open No. 10-162853
PTD 3: U.S. Pat. No. 7,927,731B2

SUMMARY OF INVENTION

Technical Problem

In recent years, requirements for durability and duration of life of the redox flow cell membrane, in particular, a requirement for oxidation resistance has been becoming more strict. In consideration of such requirements arising in recent years, the membrane described in Patent Document 1, 2, or the like is insufficient in terms of chemical stability, particularly, oxidation resistance, which leads to insufficient duration of life, disadvantageously. For this reason, development of a redox flow cell membrane has been desired which is more excellent in durability such as oxidation resistance than that in the conventional cell membrane. Meanwhile, it has been considered to employ a compound other than the vanadium-based compounds for the cell active materials of the redox flow cell. Development of a redox flow cell membrane for such a case has been also desired.

Further, the redox flow cell described in Patent Document 3 has a voltage efficiency of approximately 78%, and the membrane has a thickness of 600 μm to 1.5 mm. Hence, further improvement of the voltage efficiency is required and therefore further reduction of the membrane resistance of the membrane is required.

The present invention has an object to provide a redox flow cell membrane that has an excellent oxidation resistance sufficiently satisfying the requirement arising in recent years, that is excellent in selective permeability, and that achieves high energy efficiency, in particular, high current efficiency.

Solution to Problem

As a result of diligent study to solve the foregoing problem, the present inventors have found that when the pore size of a micropore of a porous membrane is made very small, selective permeability for ions is exhibited and therefore such a porous membrane can be used as a cell membrane for a redox flow cell or the like. Further, a fluorine-based resin porous membrane, in particular, a porous membrane made of PTFE has an excellent oxidation resistance. Hence, the present inventors have found that the above-described object can be achieved by using the fluorine-based resin porous membrane. In the present specification, the fluorine-based resin encompasses not only a synthetic resin obtained by polymerizing olefin containing fluorine, but also a resin including this synthetic resin as a main component (for example, a resin including the synthetic resin by not less than 50 mass %).

A redox flow cell membrane according to the present invention includes a porous membrane that has a mean flow pore size of not more than 100 nm, that has a thickness of not more than 500 μm, and that has an air flow rate of not less than 0.1 ml/s·cm$^2$.

The redox flow cell membrane according to the present invention has selective permeability for ions such that hydrogen ions are likely to pass therethrough and electrolytic ions such as V ions are less likely to pass therethrough. The porous membrane in the present invention has no ionic functional group. However, it is considered that the pore size of the porous membrane in the present invention is very small, so that ions can be separated based on the size of each ion, thereby exhibiting the selective permeability. As a result, a redox flow cell employing the redox flow cell membrane according to the present invention can achieve low membrane resistance, high current efficiency, and high energy efficiency. Further, when the porous membrane in the present invention is made of a fluorine-based resin, the porous membrane has high chemical stability and excellent durability, in particular, excellent oxidation resistance.

Here, the mean flow pore size represents a value measured in accordance with ASTM F316-86 and determined in the following manner using a pore distribution measuring instrument and propylene, 1, 1, 2, 3, 3, 3 hexafluoro oxidized as a liquid.

First, a relation between differential pressure applied to the membrane and air flow rate of air passing through the membrane when the membrane is dry and the relation therebetween when the membrane is wet by the liquid are measured. Resulting graphs will be respectively referred to as "dry curve" and "wet curve". Assuming that a differential pressure at an intersection between the wet curve and a curve having a flow rate ½ of that in the dry curve is represented as P (Pa), the mean flow pore size is calculated in accordance with the following formula:

mean flow pore size $d(\mu m) = c\gamma/P$ where c represents a constant of 2860 and γ represents a surface tension (dynes/cm) of the liquid.

The air flow rate is calculated by measuring gurley seconds. Here, the term "gurley second" represents an index indicating air permeability of a membrane, and is defined as time (seconds) required to allow 100 ml of air to pass through 6.42 square centimeters of membrane effective area under a differential pressure of 1.22 kPa. The gurley seconds are measured using a digital type Oken-method air permeability tester.

When the redox flow cell membrane according to the present invention is used for a V—V-based redox flow cell, the porous membrane preferably has a mean flow pore size of not more than 30 nm. As the mean flow pore size is smaller, the selective permeability for ions is improved, thereby preventing electrolytic ions from passing therethrough. As a result, when the redox flow cell membrane is used as a membrane of a cell, high current efficiency is obtained. For example, when the redox flow cell membrane including the porous membrane having a mean flow pore size of not more than 30 nm is used for a V—V-based redox flow cell and the current density is approximately 140 mA/cm$^2$, the current efficiency is approximately 90%.

The redox flow cell membrane according to the present invention is preferably used for a Ti—Mn-based, Ti—Fe-based, Fe—Cr-based, Zn—Ce-based, Zn—Br-based or Zn—Cl-based redox flow cell. In such a redox flow cell, the cell active material is larger than that in the V—V-based redox flow cell. Hence, even when the mean flow pore size of the porous membrane is not more than 100 nm, the selective permeability for ions can be prevented from being decreased.

The redox flow cell membrane according to the present invention preferably further includes a porous support membrane for supporting the porous membrane.

In order to increase the permeability for hydrogen ions in the membrane and decrease the membrane resistance to attain high voltage efficiency, the porosity of the porous membrane (a ratio of the volume of the pores in the membrane) is preferably high and the porous membrane is preferably thin. Meanwhile, the cell membrane is required to have mechanical strength that can withstand pressure of the electrolyte and the like. However, the mechanical strength is decreased when the porosity is made high or the membrane is made thin. In view of this, there is preferably employed a method of supporting the porous membrane by the porous support membrane that has mechanical strength withstanding the pressure of the electrolyte and the like and that does not hinder permeation of ions. With this method, the cell membrane is provided with the mechanical strength.

As the porous support membrane that has mechanical strength withstanding the pressure of the electrolyte and the like and that does not hinder the permeation of ions, there is preferably used a porous membrane that is formed of a resin excellent in mechanical strength (and chemical stability) such as a fluorine-based resin such as PTFE and that has a through pore having a size much larger than that of the pore of the porous membrane. The respective ranges of the thickness and porosity of the porous support membrane are not particularly limited, but are selected from ranges allowing for sufficient mechanical strength without hindering permeation of ions.

The method of supporting the porous membrane using the porous support membrane is not particularly limited, but the porous membrane is normally supported by adhering the porous membrane to a surface of the porous support membrane. Porous support membranes may be adhered to both sides of a porous membrane, i.e., the porous membrane may be sandwiched between the porous support membranes. Alternatively, porous membranes may be adhered to both sides of a porous support membrane.

In the case where both the porous membrane and the porous support membrane are formed of PTFE or a resin mainly composed of PTFE, there can be obtained a redox flow cell membrane in which the PTFE porous membrane having a minute pore size is supported by the support membrane formed of PTFE porous body with a large pore size and excellent in mechanical strength by the following method including steps 1 to 3, for example. It should be noted that the porous membrane and the porous support membrane may be made of different fluorine-based resins.

Step 1: a PTFE non-porous membrane is formed by sintering PTFE powders.

Step 2: a composite body is formed by adhering the PTFE non-porous membrane formed in step 1 onto a PTFE porous membrane having a predetermined mechanical strength, using a fluororesin-based adhesive agent.

Step 3: the formed composite body is expanded.

In the redox flow cell membrane according to the present invention, the porous membrane preferably has a surface treated with an ion exchange resin.

When the surface of the porous membrane is treated with the ion exchange resin, current efficiency can be improved.

Here, the expression "the surface of the porous membrane is treated with the ion exchange resin" is intended to mean that a cation exchange resin is applied onto the surface of the porous membrane. A fluororesin-based cation exchange resin is preferably used as the cation exchange resin. Examples thereof include a copolymer of tetrafluoroethylene and perfluoro[2-(fluorosulfonylethoxy) propyl vinyl ether], which is commercially available under the trademark "Nafion®".

In the case where the copolymer of tetrafluoroethylene and perfluoro[2-(fluorosulfonylethoxy) propyl vinyl ether] is used as the cation exchange resin, the surface treatment by the cation exchange resin can be performed by applying a dispersion, which has the copolymer dispersed as aggregates of particles, onto the surface of the porous membrane, and then cleaning and drying it, for example. The cation exchange resin thus applied renders the surface of the porous membrane hydrophilic, thereby improving current efficiency when it is used as a redox flow cell membrane.

The redox flow cell membrane of the present invention has excellent selective permeability and excellent durability such as oxidation resistance. When the redox flow cell membrane is used as a vanadium-based redox flow cell membrane particularly required to have an oxidation resistance, an effect thereof is particularly exhibited.

Advantageous Effects of Invention

The redox flow cell membrane of the present invention has excellent oxidation resistance and excellent selective permeability for ions. As a result, the use of the redox flow cell membrane provides a cell fabricated to have duration of life sufficiently satisfying the requirement arising in recent years, as well as high energy efficiency, in particular, high current efficiency. The present invention is particularly suitably used as a V—V-based redox flow cell membrane.

DESCRIPTION OF EMBODIMENTS

The following describes the present invention based on embodiments thereof, but the present invention is not limited to the below-described embodiments. Various changes can be made to the below-described embodiments within the same or corresponding scope as the scope of the present invention.

With reference to figures, the following first describes structure, production method, function, and principle of an exemplary redox flow cell membrane of the present invention.

(1) Structure

Figure 1:
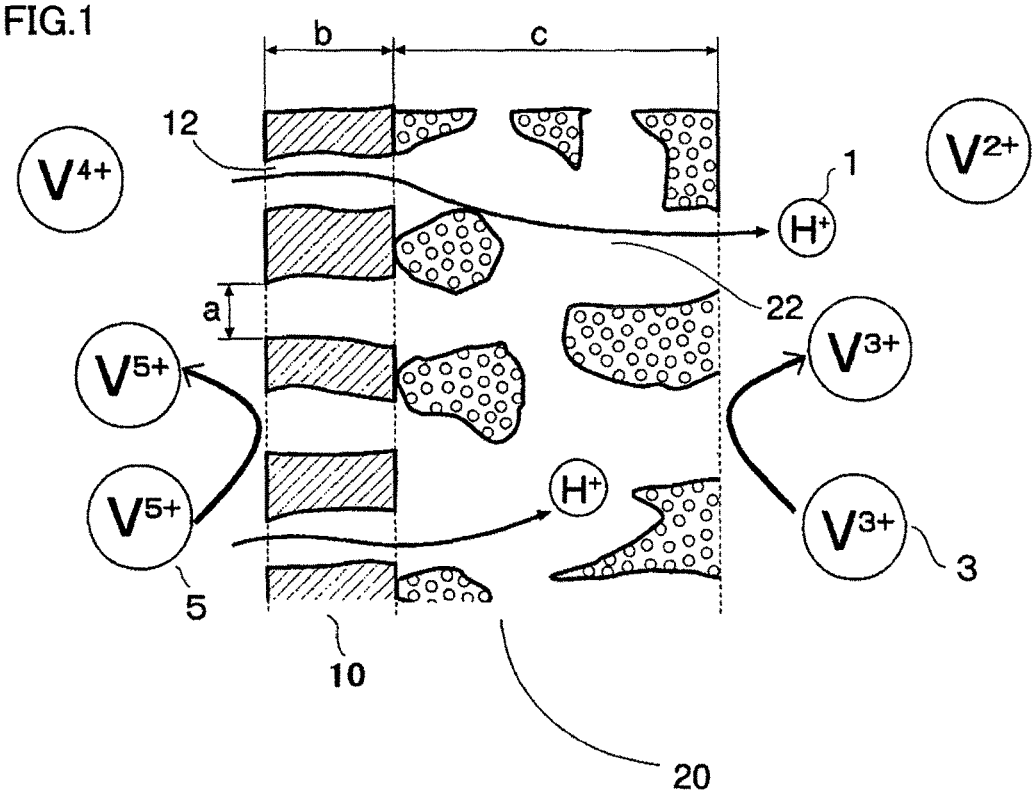
FIG. 1 is an enlarged cross sectional view schematically showing one exemplary redox flow cell membrane of the present invention.

FIG. 1 schematically shows an enlarged cross section of this redox flow cell membrane. As shown in FIG. 1, a fluorine-based resin porous membrane 10 is adhered to and supported by a surface of a porous support membrane 20. Fluorine-based resin porous membrane 10 is provided with a plurality of micropores 12. Porous support membrane 20 is provided with a plurality of pores 22.

In this example, the cell membrane is disposed such that fluorine-based resin porous membrane 10 is at an electrolyte side in which +4 valent or +5 valent V ions exist, i.e., at the positive electrode chamber side and porous support membrane 20 is at an electrolyte side in which +2 valent or +3 valent V ions exist, i.e., at the negative electrode chamber side. However, the cell membrane can be disposed such that fluorine-based resin porous membrane 10 and porous support membrane 20 are disposed in an opposite manner. Further, as described above, porous support membranes can be provided at both sides of a fluorine-based resin porous membrane or fluorine-based resin porous membranes can be provided at both sides of a porous support membrane.

As shown in FIG. 1, each of micropores 12 is a through hole extending through fluorine-based resin porous membrane 10 from the front side to the rear side thereof (not necessarily in a straight manner). Micropore 12 is considered to have a size a close in size to the mean flow pore size in fluorine-based resin porous membrane 10. The mean flow pore size in fluorine-based resin porous membrane 10 is preferably not more than 100 nm. In this way, hydrogen ions 1 pass through fluorine-based resin porous membrane 10, whereas V ions are less likely to pass through fluorine-based resin porous membrane 10. This provides improved selective permeability for ions in fluorine-based resin porous membrane 10. When fluorine-based resin porous membrane 10 is used as a V—V-based redox flow cell membrane as in the example shown in FIG. 1, fluorine-based resin porous membrane 10 more preferably has a mean flow pore size of not more than 30 nm, further preferably, not more than 10 nm. In this way, V ions are even less likely to pass through fluorine-based resin porous membrane 10, thereby achieving more improved selective permeability for ions in fluorine-based resin porous membrane 10. Here, an exemplary method of providing fluorine-based resin porous membrane 10 with a mean flow pore size of not more than 100 nm is a method described in the below-described section "(2) Production Method" and the like. Further, as a method of providing fluorine-based resin porous membrane 10 with a mean flow pore size of not more than 30 nm, the same method can be used as the method of providing fluorine-based resin porous membrane 10 with a mean flow pore size of not more than 100 nm except that the resin material is changed.

As thickness b of fluorine-based resin porous membrane 10 is thinner, permeability for hydrogen ions 1 is higher. Hence, in order to obtain high voltage efficiency (low membrane resistance), thickness b of fluorine-based resin porous membrane 10 is preferably thin. However, when fluorine-based resin porous membrane 10 has a thin thickness b, V ions are more likely to pass therethrough. Hence, in view of the both, an optimum thickness is selected. When fluorine-based resin porous membrane 10 has a thickness of not more than 500 μm, high voltage efficiency can be obtained although this is not always true because the permeability for hydrogen ions 1 is also dependent on the porosity of fluorine-based resin porous membrane 10 as described later.

When the porosity of fluorine-based resin porous membrane 10 is larger, the permeability for hydrogen ions 1 becomes higher. Hence, such a large porosity is preferable in obtaining high voltage efficiency (low membrane resistance). However, a large porosity allows V ions to more likely to pass therethrough. Hence, in consideration of the both, an optimum porosity is selected. When fluorine-based resin porous membrane 10 has an air flow rate of not less than 0.1 ml/s·cm$^2$, high voltage efficiency can be obtained. Preferably, fluorine-based resin porous membrane 10 has an air flow rate of not less than 0.2 ml/s·cm$^2$. Here, an exemplary method of providing fluorine-based resin porous membrane 10 with an air flow rate of not less than 0.1 ml/s·cm$^2$ can be a method described in the below-described section "(2) Production Method" and the like. The air flow rate of fluorine-based resin porous membrane 10 can be changed by changing a resin material or a production parameter. Further, when fluorine-based resin porous membrane 10 is a porous membrane made of PTFE, fluorine-based resin porous membrane 10 can be produced by heating PTFE powders and applying pressure thereto to form it into a non-porous membrane having a sheet-like shape, and expanding the non-porous membrane as described above. However, in this method, when the porosity is made large, size a of micropore 12 becomes also large. Hence, also in view of this, the magnitude of the porosity is restricted. When fluorine-based resin porous membrane 10 is a porous membrane made of PTFE, the porosity is preferably approximately 20 to 50%. Here, the porosity can be calculated by using, for example, the following formula: porosity=1−(the mass of fluorine-based resin porous membrane 10)÷(the volume of fluorine-based resin porous membrane 10)×(the true density of the material composing fluorine-based resin porous membrane 10).

As described above, thickness c and porosity of porous support membrane 20 are respectively selected in ranges with which sufficient mechanical strength is obtained without hindering the permeability for ions. Further, the pore size of pore 22 is also selected from a range of sizes much larger than size a of micropores 12 so as not to hinder the permeability for ions. When a PTFE porous membrane is used as porous support membrane 20, pore 22 normally has a pore size of 0.2 to 10 μm and has a thickness c of approximately 20 to 500 μm.

A cation exchange resin may be applied for hydrophilization treatment onto a surface of fluorine-based resin porous membrane 10 at the positive electrode chamber side (not shown in the figure). By the hydrophilization treatment, current efficiency can be improved.

(2) Production Method

The redox flow cell membrane having fluorine-based resin porous membrane 10 supported on porous support membrane 20 can be produced using the method described in Patent Document 1, Japanese Patent Laying-Open No. 2009-179802, Japanese Patent Laying-Open No. 2011-52175, or WO 2008/018400. For example, the redox flow cell membrane can be produced using the following method including steps 1) to 6).

1) An aluminum foil having a thickness of, for example, 50 μm is spread and is fixed on a glass plate such that no wrinkling is formed. A PTFE dispersion (AD911 provided by Asahi Glass Co., Ltd can be used, for example) is dropped in which PTFE powders are dispersed in a dispersion medium such as water. Thereafter, the PTFE dispersion is uniformly expanded all over the aluminum foil using a slide shaft or the like.

2) Next, drying is performed at approximately 80° C. for 60 minutes, for example. Thereafter, heating is performed at approximately 250 to 340° C. for 1 to 2 hours, which is followed by natural cooling, thereby forming a non-porous PTFE thin membrane fixed on the aluminum foil.

3) The non-porous PTFE thin membrane fixed on the aluminum foil is spread and fixed on a glass plate such that no wrinkling is formed and the non-porous PTFE thin membrane faces upward. Then, a dispersion of a thermoplastic fluororesin (for example, tetrafluoroethylene-perfluoroalkyl vinyl ether copolymer (PFA)) having a melting point lower than that of PTFE is dropped. Thereafter, a slide shaft or the like is used to uniformly expand the dispersion of the fluororesin over the non-porous PTFE thin membrane. This thermoplastic fluororesin functions as an adhesive agent that provides adhesion between the non-porous PTFE thin membrane and a below-described expanded PTFE porous body.

4) Before the moisture is dried out, the expanded PTFE porous body (Poreflon FP-045-80 provided by Sumitomo Electric Fine Polymer, Inc can be used, for example) having a pore size of approximately 0.5 μm and a thickness of approximately 80 μm is provided to cover it.

5) Thereafter, drying is performed at approximately 80° C. for approximately 60 minutes, for example. Thereafter, heating is performed at approximately 250 to 340° C. for 1 to 2 hours, which is followed by natural cooling, thereby obtaining a composite body in which the non-porous PTFE thin membrane is adhered on the expanded PTFE porous body using the thermoplastic fluororesin having a melting point lower than that of PTFE and the aluminum foil is fixed thereon.

6) By melting the aluminum foil using hydrochloric acid, the aluminum foil is removed from the composite body and the composite body is then uniaxially or biaxially expanded. As a result, the non-porous PTFE thin membrane is formed into a PTFE porous membrane having micropores with uniform pore size, thereby producing a redox flow cell membrane having PTFE porous membrane 10 supported on porous support membrane 20 formed of the PTFE porous body.

(3) Function and Principle Thereof

The mean flow pore size of fluorine-based resin porous membrane 10 is not more than 100 nm, preferably, not more than 30 nm. Accordingly, as shown in FIG. 1, H (hydrogen) ions 1 (actually, hydronium ions and the like) are so small that they can pass through micropores 12 formed in fluorine-based resin porous membrane 10, but V ions 3, 5 are so large that they cannot pass through micropores 12. As a result, fluorine-based resin porous membrane 10 exhibits selective permeability.

Figure 2:
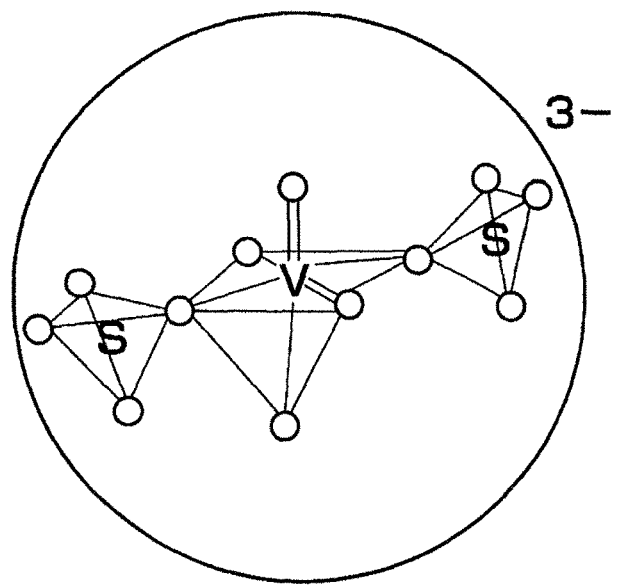
FIG. 2 schematically shows a spatial configuration of one exemplary pentavalent vanadium ion.

It should be noted that a +5 valent V ion has a structure shown in FIG. 2. A sphere shown as a circle in FIG. 2 has a radius of approximately several nm, but it is considered that further coordination of water molecules causes it to less likely to pass through a micropore having a size of 100 nm. The same applies to the other V ions. Further, when the surface of fluorine-based resin porous membrane 10 is treated with a cation exchange resin, it is considered that V ions are even less likely to pass through micropores 12. As a result, current efficiency is considered to be improved. In order to attain such an effect, an amount of addition of the cation exchange resin is preferably not less than 5 mass %, more preferably, not less than 10 mass % relative to the fluorine-based resin porous membrane. It should be noted that the amount of addition of the cation exchange resin can be calculated by subtracting (the mass of fluorine-based resin porous membrane 10 before treating the surface of fluorine-based resin porous membrane 10 with the cation exchange resin) from (the mass of fluorine-based resin porous membrane 10 after treating the surface of fluorine-based resin porous membrane 10 with the cation exchange resin), for example.

Heretofore, it has been mainly illustrated that fluorine-based resin porous membrane 10 is used as the V—V-based redox flow cell membrane, but fluorine-based resin porous membrane 10 can be also used as a membrane for a Ti—Mn-based redox flow cell, a Ti—Fe-based redox flow cell, a Fe—Cr-based redox flow cell, a Zn—Ce-based redox flow cell, a Zn—Br-based redox flow cell, a Zn—Cl-based redox flow cell, or the like. In this case, the mean flow pore size of fluorine-based resin porous membrane 10 does not need to be not more than 30 nm as long as it is not more than 100 nm. Even in such a case, electrolytic ions such as Ti ions can be prevented from passing through fluorine-based resin porous membrane 10.

Here, in the V—V-based redox flow cell, a vanadium-based compound such as vanadium sulfate is used as each of the positive electrode active material and the negative electrode active material. In the Ti—Mn-based redox flow cell, a manganese-based compound such as manganese sulfate is used as the positive electrode active material and a titanium-based compound such as titanium sulfate is used as the negative electrode active material. In the Ti—Fe-based redox flow cell, an iron-based compound such as iron chloride or iron sulfate is used as the positive electrode active material, and a titanium-based compound such as titanium chloride or titanium sulfate is used as the negative electrode active material. In the Fe—Cr-based redox flow cell, as the positive electrode active material and the negative electrode active material, a mixture of an iron-based compound such as iron chloride and a chromium-based compound such as chromium chloride is used. In the Zn—Ce-based redox flow cell, a zinc-based compound such as zinc is used as the negative electrode active material, and a selenium-based compound dissolved in an aqueous solution of sulfuric acid or methanesulfonic acid is used as the positive electrode active material. In the Zn—Br-based redox flow cell, the zinc-based compound such as zinc is used as the negative electrode active material, and a bromine-based compound such as zinc bromide is used as the positive electrode active material. In the Zn—Cl-based redox flow cell, a zinc-based compound such as zinc is used as the negative electrode active material, and a chlorine-based compound such as zinc chloride is used as the positive electrode active material.

EXAMPLES

Example 1

[Fabrication of Membrane Sample]
[Preparation of Fluorine-Based Resin Dispersion]

A PTFE dispersion 34JR (molecular weight of 600,000) and an MFA latex and PFA dispersion 920HP (each provided by DuPont-Mitsui Fluorochemicals Co. Ltd) were used to prepare a dispersion in which each of MFA/(PTFE+MFA+PFA) (volume ratio) and PFA/(PTFE+MFA+PFA) (volume ratio) was 2%. Polyethylene oxide having a molecular weight of 2,000,000 and polyoxyethylene alkyl ether sulfate ester triethanolamine (20T provided by Kao Corporation) were added to this dispersion such that the polyethylene oxide had a concentration of 3 mg/ml and the polyoxyethylene alkyl ether sulfate ester triethanolamine had a concentration of 10 mg/ml, thereby preparing a fluorine-based resin dispersion.

[Fabrication of Membrane Sample]

An aluminum foil having a thickness of 50 μm was spread and fixed on a glass plate such that no wrinkling was formed. Then, the above-described fluorine-based resin dispersion was dropped. Thereafter, a slide shaft (trademark: Stainless Fine Shaft SNSF type; outer diameter: 20 mm) provided by Nippon Bearing Co., Ltd and made of stainless steel was slid thereon to uniformly expand the fluorine-based resin dispersion all over the aluminum foil.

This foil was subjected to each of steps of drying at 80° C. for 60 minutes, heating at 250° C. for 1 hour, and heating at 340° C. for 1 hour, which was followed by natural cooling. In this way, a fluorine-based resin thin membrane (non-porous fluorine-based resin thin membrane mainly composed of PTFE) fixed on the aluminum foil was formed. The fluorine-based resin thin membrane had a mean thickness of approximately 2 μm, which was calculated based on a weight difference per unit area of the aluminum foil between the weight before the formation of the fluorine-based resin thin membrane and the weight after the formation and the true specific gravity (2.25 g/cm$^3$) of the fluorine-based resin.

Next, polyethylene oxide having a molecular weight of 2,000,000 and polyoxyethylene alkyl ether sulfate ester triethanolamine (20T provided by Kao Corporation) was added to a PFA dispersion, which was obtained by diluting PFA dispersion 920HP using distilled water up to a volume four times larger, such that the polyethylene oxide had a concentration of 3 mg/ml and the polyoxyethylene alkyl ether sulfate ester triethanolamine had a concentration of 10 mg/ml, thereby obtaining a 4-fold diluted PFA dispersion.

On the fluorine-based resin thin membrane fixed on the aluminum foil, the 4-fold diluted PFA dispersion was dropped. Thereafter, while sliding the above-described slide shaft provided by Nippon Bearing Co., Ltd and made of stainless steel to uniformly expand the 4-fold diluted PFA dispersion over the fluorine-based resin thin membrane, an expanded PTFE porous body (provided by Sumitomo Electric Fine Polymer, Inc; trademark: Poreflon FP-045-80) (IPA-BP: 150 kPa; porosity: 70%; gurley seconds: 9.1 seconds) having a pore size of 0.45 μm and a thickness of 80 μm was provided to cover it before moisture was dried out. Next, each of steps of drying at 80° C. for 60 minutes, heating at 250° C. for 1 hour, heating at 320° C. for 1 hour, and heating at 317.5° C. for 8 hours was performed, which was followed by natural cooling, thereby obtaining a composite body in which the non-porous fluorine-based resin thin membrane mainly composed of PTFE was adhered on the expanded PTFE porous body by a thermoplastic PFA having a melting point lower than that of PTFE and the aluminum foil was fixed thereon. Next, the aluminum foil was melted and removed by hydrochloric acid, thereby obtaining a laminate of the non-porous PTFE membrane and the expanded PTFE porous body.

[Expansion]

Next, the laminate of the non-porous PTFE membrane and the expanded PTFE porous body was expanded using a tensile tester at a temperature of 25° C., a chuck interval of 55 mm, and a stroke of 165 mm (expansion ratio of 200%) in the width direction. Thereafter, using the same tensile tester, the laminate was expanded at a temperature of 25° C., a chuck interval of 55 mm, and a stroke of 88 mm (expansion ratio of 60%) in a direction orthogonal to the width direction. In this way, a porous fluorine-based resin membrane composite body was obtained. This porous fluorine-based resin membrane composite body is configured such that the fluorine-based resin porous membrane having a thickness of 1 μm was adhered to the porous support membrane having a thickness of 50 μm and a mean pore size of approximately 1 μm. This was employed as a membrane sample. The mean flow pore size of the porous fluorine-based resin membrane composite body thus obtained was measured using a below-described method. The mean flow pore size was 40 nm.

[Method of Measuring Mean Flow Pore Size]

The measurement was performed using a pore distribution measuring instrument (palm porometer CFP-1500A provided by Porous Materials, Inc) in the above-described manner with GALWICK (propylene 1, 1, 2, 3, 3, hexafluoro oxidized (provided by Porous Materials, Inc)) being used as a liquid.

Membrane samples having mean flow pore sizes of 30, 15, 10 and 8 nm were fabricated in the same manner except that expansion and annealing conditions were changed.

[Method of Measuring Air Flow Rate]

The air flow rate was calculated by measuring gurley seconds. Specifically, in accordance with the JISP8117 gurley tester method, a digital type Oken-method air permeability tester was employed to measure the air flow rate.

Figure 3:
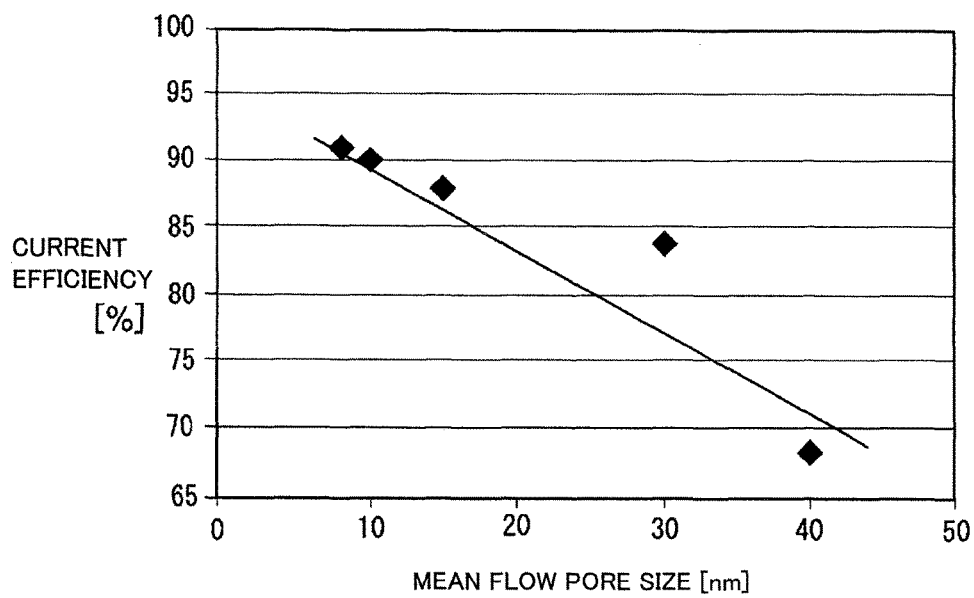
FIG. 3 is a graph showing a relation between current efficiency and mean flow pore size in Example 1.

Each of the membrane samples obtained as described above was used for a redox flow cell in which a vanadium sulfate solution was used as an electrolyte and carbon fiber electrodes were used. In accordance with below-described "charging/discharging conditions", performance evaluation was conducted with regard to the redox flow cell so as to measure current efficiency and cell resistance. Table 1 shows a relation among the measured values of current efficiency and cell resistance, the mean flow pore size, and the air flow rate. FIG. 3 shows a relation between the current efficiency and the mean flow pore size.

(Charging/Discharging Conditions)

Charging/discharging method: constant current
Charging end voltage: 1.55 (V)
Discharging end voltage: 1.00 (V)
Temperature: 25° C.

Here, the current efficiency and the cell resistance are values found by the following formulas:

current efficiency(%)=discharging electric amount/charging electric amount=discharging time/charging time charging electric amount=charging time×(current density×electrode area)=charging time×electric current discharging electric amount=discharging time×(current density×electrode area)=discharging time× electric current cell resistance($\Omega \cdot cm^2$)=(cell terminal voltage−open circuit voltage)/current density In Example 1, the current density was 70 mA/cm².

TABLE 1

| Mean Flow Pore Size (nm) | Air Flow Rate (ml/s · cm²) | Current Efficiency (%) | Cell Resistance ($\Omega cm^2$) |
| --- | --- | --- | --- |
| 40 | 1.33 | 68 | 0.85 |
| 30 | 0.98 | 84 | 0.84 |
| 15 | 0.20 | 88 | 0.97 |

TABLE 1-continued

| Mean Flow Pore Size (nm) | Air Flow Rate (ml/s · cm²) | Current Efficiency (%) | Cell Resistance ($\Omega cm^2$) |
| --- | --- | --- | --- |
| 10 | 0.16 | 90 | 1.28 |
| 8 | 0.10 | 91 | 1.3 |

From Table 1, it is found that as the mean flow pore size is smaller, the current efficiency is improved and the cell resistance (membrane resistance) is increased. FIG. 3 also shows that as the mean flow pore size is smaller, the current efficiency is improved. It is considered that as the mean flow pore size is smaller, permeation of V ions is hindered and the current efficiency is therefore improved, but permeation of hydrogen ions is also hindered and therefore cell resistance is also increased. From FIG. 3, it is understood that when the mean flow pore size was 40 nm, a current efficiency of approximately 70% was obtained, when the mean flow pore size was 30 nm, a current efficiency of not less than 80% was obtained, and when the mean flow pore size was 10 nm, a current efficiency of not less than 90% was obtained.

Example 2

Nafion®, a fluorine-based cation exchange resin provided by Dupont, was applied onto respective surfaces of the membrane sample (referred to as "NM-15") having a mean flow pore size of 15 nm and obtained in Example 1 and the membrane sample (referred to as "NM-30") having a mean flow pore size of 30 nm and obtained in Example 1, then cleaning with pure water was performed, then heating was performed, and surface treatment was performed. By subtracting (the mass of the membrane sample before the application of Nafion) from (the mass of the membrane sample after the application of Nafion), the amount of addition of Nafion was measured. The amount of addition of Nafion was 5 mass % with respect to the mass of the fluorine-based resin porous membrane.

Figure 4:
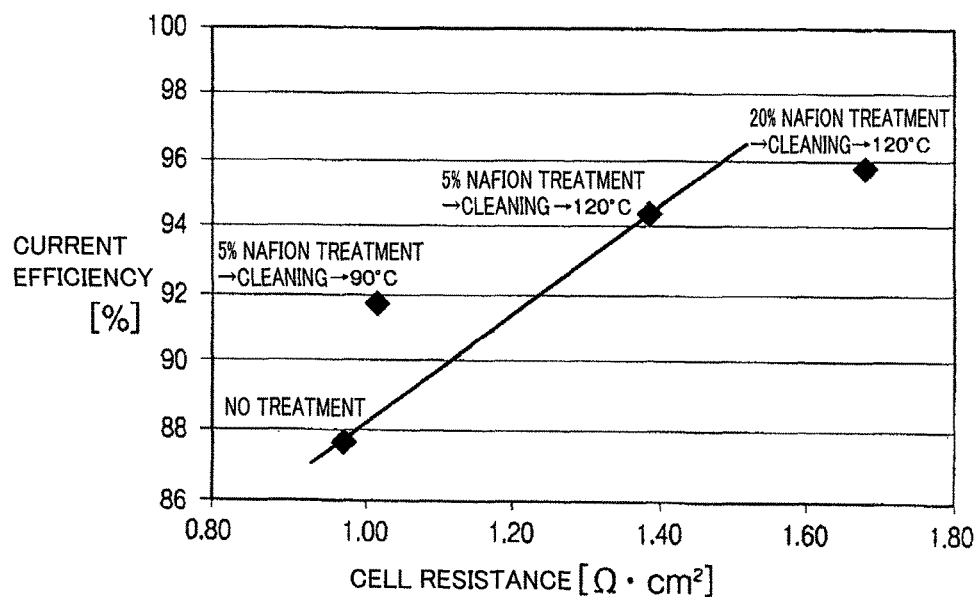
FIG. 4 is a graph showing a relation between current efficiency and cell resistance in Example 2.

FIG. 4 shows a relation between the current efficiency and the cell resistance in the case where a Nafion solution (solvent: isopropyl alcohol) having a concentration shown in the figure was applied onto a surface of the PTFE separating layer membrane having a mean flow pore size of 15 nm, then cleaning with pure water was performed, and heating at a temperature shown in the figure was performed after the cleaning. In FIG. 4, the vertical axis represents the current efficiency (%), whereas the horizontal axis represents the cell resistance ($\Omega cm^2$). Further, the concentration of the Nafion solution used for the treatment and the heating temperature are shown in the figure. In the figure, the illustration "→cleaning→" represents a case where the cleaning with pure water was performed. In the case where this illustration is not provided, heating was performed without performing the cleaning after the application of the Nafion solution. The same applies to FIG. 5 illustrated below.

FIG. 4 shows that the treatment by Nafion leads to improvement of the current efficiency. However, the cell resistance is also increased. It is also shown that as the concentration of Nafion is increased or as the drying temperature is increased, higher current efficiency is obtained and the cell resistance is also increased.

Example 3

Figure 5:
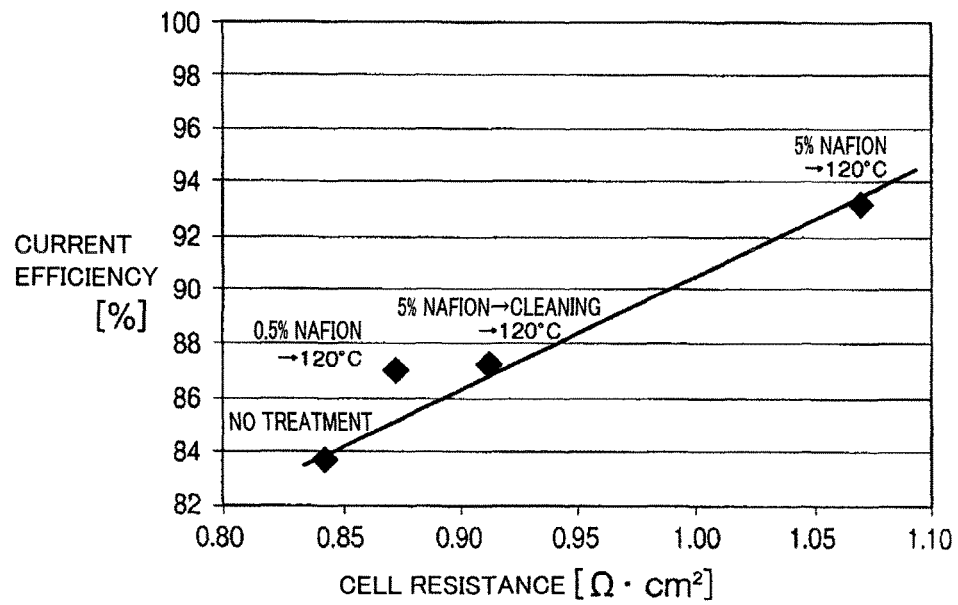
FIG. 5 is a graph showing a relation between current efficiency and cell resistance in Example 3.

FIG. 5 shows a relation between the current efficiency and the cell resistance in the case where the treatment was performed using Nafion in the same manner as in Example 2 except that a PTFE separating layer membrane having a mean flow pore size of 30 nm was employed instead of the PTFE separating layer membrane having a mean flow pore size of 15 nm. As with Example 2, it is shown that as the concentration of Nafion is increased, higher current efficiency is obtained.

Example 4

Figure 6:
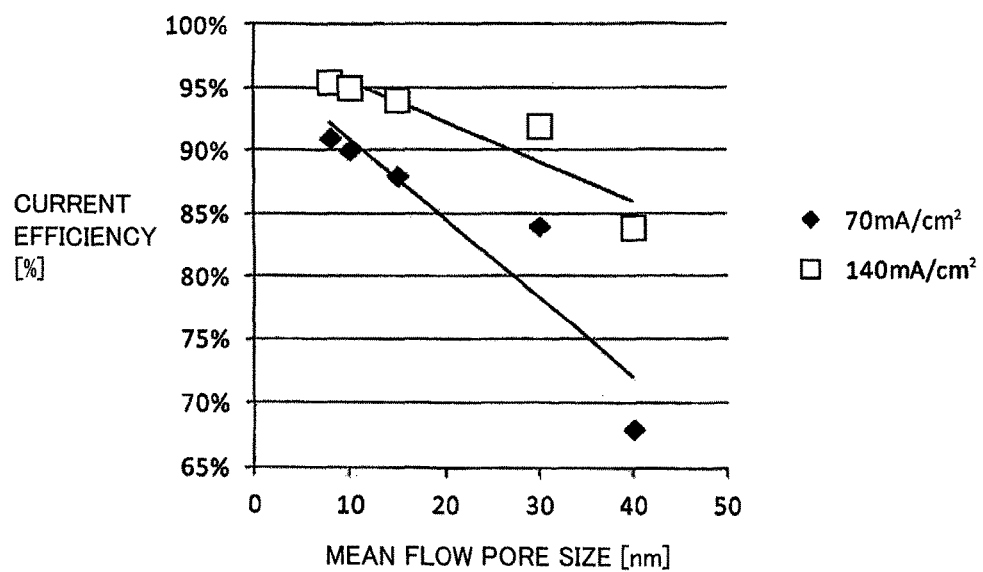
FIG. 6 is a graph showing a relation between current efficiency and mean flow pore size in Examples 1 and 4.

Current efficiency was measured in the same manner as in Example 1 except that the current density of the charging/discharging conditions was 140 mA/cm$^2$. Table 2 shows a relation among the measured values of current efficiency and cell resistance, the mean flow pore size, and the air flow rate. FIG. 6 shows a relation between the current efficiency and the mean flow pore size. It should be noted that the data "70 mA/cm$^2$" in FIG. 6 corresponds to the data in Example 1. From Table 2 and FIG. 6, it is understood that as the mean flow pore size is smaller, the current efficiency is improved and the cell resistance is increased as with Example 1.

TABLE 2

| Mean Flow Pore Size (nm) | Air Flow Rate (ml/s · cm$^2$) | Current Efficiency (%) | Cell Resistance (Ωcm$^2$) |
|---|---|---|---|
| 40 | 1.33 | 84 | 0.84 |
| 30 | 0.98 | 92 | 0.86 |
| 15 | 0.20 | 94 | 0.97 |
| 10 | 0.16 | 95 | 1.28 |
| 8 | 0.10 | 95.5 | 1.3 |

Example 5

Figure 7:
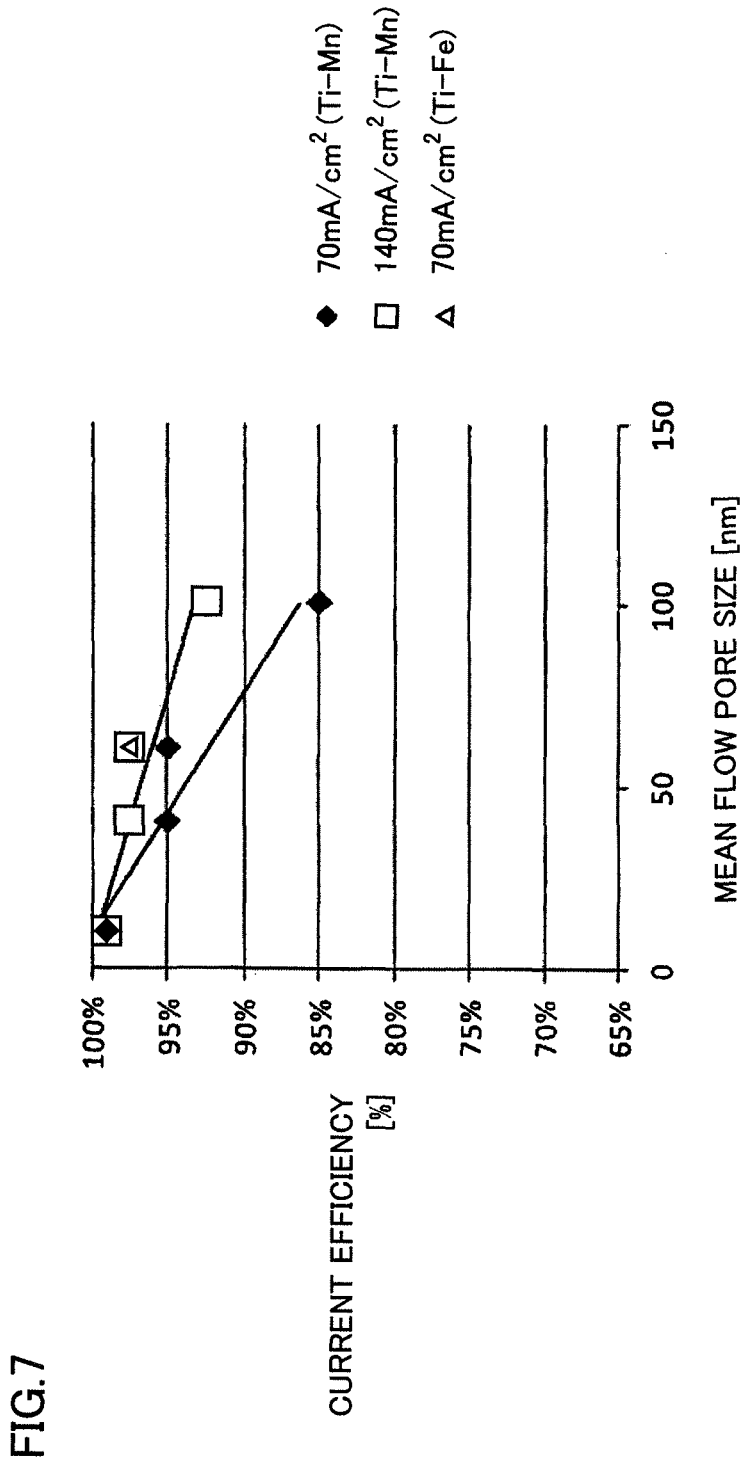
FIG. 7 is a graph showing a relation between current efficiency and mean flow pore size in each of Examples 5 to 8.

Current efficiency was measured in the same manner as in Example 1 except that each of the membrane samples was used in a redox flow cell in which a manganese sulfate (divalent) solution was used for the positive electrode electrolyte, a titanium sulfate (tetravalent) solution was used for the negative electrode electrolyte, and carbon fiber electrodes were used. The current density in the charging/discharging conditions was 70 mA/cm$^2$. Table 3 shows a relation among the measured values of current efficiency and cell resistance, the mean flow pore size, and the air flow rate. FIG. 7 shows a relation between the current efficiency and the mean flow pore size. From Table 3 and FIG. 7, it is understood that even in the case where the membrane sample was used for the Ti—Mn-based redox flow cell membrane, as the mean flow pore size is smaller, the current efficiency is improved and the cell resistance is increased. Further, it is understood that in the case where the membrane sample is used for the Ti—Mn-based redox flow cell membrane, current efficiency is not less than 85% even when the mean flow pore size is approximately 100 nm.

TABLE 3

| Mean Flow Pore Size (nm) | Air Flow Rate (ml/s · cm$^2$) | Current Efficiency (%) | Cell Resistance (Ωcm$^2$) |
|---|---|---|---|
| 100 | 10.8 | 85 | 1.1 |
| 60 | 4.30 | 95 | 1.1 |
| 40 | 1.33 | 95 | 1.3 |
| 10 | 0.16 | 99 | 1.5 |

Example 6

Current efficiency was measured in the same manner as in Example 5 except that the current density of the charging/discharging conditions was 140 mA/cm$^2$. Table 4 shows a relation among the measured values of current efficiency and cell resistance, the mean flow pore size, and the air flow rate. FIG. 7 shows a relation between the current efficiency and the mean flow pore size. From Table 4 and FIG. 7, it is understood that even in the case where the membrane sample was used for the Ti—Mn-based redox flow cell membrane, as the mean flow pore size is smaller, the current efficiency is improved and the cell resistance is increased. Further, it is understood that in the case where the membrane sample is used for the Ti—Mn-based redox flow cell membrane, current efficiency is not less than 92.5% even when the mean flow pore size is approximately 100 nm.

TABLE 4

| Mean Flow Pore Size (nm) | Air Flow Rate (ml/s · cm$^2$) | Current Efficiency (%) | Cell Resistance (Ωcm$^2$) |
|---|---|---|---|
| 100 | 10.8 | 92.5 | 0.85 |
| 60 | 4.30 | 97.5 | 0.97 |
| 40 | 1.33 | 97.5 | 1.28 |
| 10 | 0.16 | 99 | 1.45 |

Example 7

Current efficiency was measured in the same manner as in Example 1 except that each of the membrane samples was used in a redox flow cell in which an iron sulfate (divalent) solution was used for the positive electrode electrolyte, a titanium sulfate (tetravalent) solution was used for the negative electrode electrolyte, and carbon fiber electrodes were used. In the charging/discharging conditions, the charging end voltage and the discharging end voltage are respectively 1 V and 0 V. The current density was 70 mA/cm$^2$. Table 5 shows a relation among the measured values of current efficiency and cell resistance, the mean flow pore size, and the air flow rate. FIG. 7 shows a relation between the current efficiency and the mean flow pore size. From Table 5 and FIG. 7, even in the case where the membrane sample is used for the Ti—Fe-based redox flow cell membrane, it is understood that current efficiency and cell resistance comparable to those in the case where the membrane sample is used for the Ti—Mn-based redox flow cell membrane are obtained.

TABLE 5

| Mean Flow Pore Size (nm) | Air Flow Rate (ml/s · cm$^2$) | Current Efficiency (%) | Cell Resistance (Ωcm$^2$) |
|---|---|---|---|
| 60 | 4.30 | 97 | 1.2 |

Example 8

Current efficiency was measured in the same manner as in Example 7 except that the current density of the charging/discharging conditions was 140 mA/cm$^2$. Table 6 shows a relation among the measured values of current efficiency and cell resistance, the mean flow pore size, and the air flow rate. From Table 6, even in the case where the membrane sample is used for the Ti—Fe-based redox flow cell membrane, it is understood that current efficiency and cell resistance comparable to those in the case where the membrane sample is used for the Ti—Mn-based redox flow cell membrane are obtained.

TABLE 6

| Mean Flow Pore Size (nm) | Air Flow Rate (ml/s · cm$^2$) | Current Efficiency (%) | Cell Resistance (Ωcm$^2$) |
|---|---|---|---|
| 60 | 4.30 | 98 | 1 |

REFERENCE SIGNS LIST

1: hydrogen ion; 3: +3 valent vanadium ion; 5: +5 valent vanadium ion; 10: fluorine-based resin porous membrane; 12: micropore; 20: porous support membrane; 22: pore.

The invention claimed is:

1. A redox flow cell comprising:
    a membrane disposed between a positive electrode chamber and a negative electrode chamber,
    the membrane comprising a porous membrane that has unfilled pores, that has a mean flow pore size of not more than 100 nm, that has a thickness of not more than 500 μm, and that has an air flow rate of not less than 0.1 ml/s·cm$^2$, and
    the porous membrane being made of a fluorine-based resin,
    wherein said porous membrane has a surface treated with an ion exchange resin.

2. The redox flow cell according to claim 1, wherein the membrane is used for a V—V-based redox flow cell, and
    said porous membrane has a mean flow pore size of not more than 30 nm.

3. The redox flow cell according to claim 1, wherein the membrane is used for a Ti—Mn-based, Ti—Fe-based, Fe—Cr-based, Zn—Ce-based, Zn—Br-based or Zn—Cl-based redox flow cell.

4. The redox flow cell according to claim 1, further comprising a porous support membrane for supporting said porous membrane.

* * * * *